United States Patent
Kim et al.

(10) Patent No.: US 10,432,324 B2
(45) Date of Patent: Oct. 1, 2019

(54) METHOD FOR PERFORMING SELF-INTERFERENCE REMOVAL BY COMMUNICATION DEVICE USING FDR MODE

(71) Applicant: LG ELECTRONICS INC., Seoul (KR)

(72) Inventors: Dongkyu Kim, Seoul (KR); Kwangseok Noh, Seoul (KR); Hyunsoo Ko, Seoul (KR); Kukheon Choi, Seoul (KR); Sangrim Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 21 days.

(21) Appl. No.: 15/566,655

(22) PCT Filed: Jan. 26, 2016

(86) PCT No.: PCT/KR2016/000812
§ 371 (c)(1),
(2) Date: Oct. 13, 2017

(87) PCT Pub. No.: WO2016/167454
PCT Pub. Date: Oct. 20, 2016

(65) Prior Publication Data
US 2018/0115370 A1    Apr. 26, 2018

Related U.S. Application Data

(60) Provisional application No. 62/148,748, filed on Apr. 17, 2015.

(51) Int. Cl.
*H04B 7/005* (2006.01)
*H04B 15/00* (2006.01)
(Continued)

(52) U.S. Cl.
CPC ........... *H04B 15/00* (2013.01); *H04B 1/12* (2013.01); *H04B 1/525* (2013.01); *H04L 5/14* (2013.01);
(Continued)

(58) Field of Classification Search
CPC .......... H04B 15/00; H04B 1/525; H04B 1/12; H04L 5/14; H04L 27/26; H04L 5/1461; H04L 5/0023
(Continued)

(56) References Cited

U.S. PATENT DOCUMENTS

2012/0106405 A1    5/2012  Lioliou et al.
2013/0301488 A1*  11/2013  Hong ................. H04B 1/56
                                                    370/278
2014/0016515 A1    1/2014  Jana et al.

FOREIGN PATENT DOCUMENTS

WO    2013173250      11/2013
WO    WO-2013173250 A1 * 11/2013 ............ H04W 16/14
WO    2014127742      8/2014

OTHER PUBLICATIONS

PCT International Application No. PCT/KR2016/000812, Written Opinion of the International Searching Authority dated May 20, 2016, 17 pages.

* cited by examiner

*Primary Examiner* — Mang Hang Yeung
(74) *Attorney, Agent, or Firm* — Lee, Hong, Degerman, Kang & Waimey

(57) ABSTRACT

A method for performing self-interference removal by a communication device using a full-duplex radio (FDR) mode, according to an embodiment of the present invention, comprises a step for branching a residual self-interference signal, after removal of an antenna self-interference signal, into a plurality of reception RF chains. And the present (Continued)

invention enables determining of whether or not digital self-interference removal is to be performed after combining the plurality of self-interference signals, which have been branched, on the basis of a predefined threshold and strength of each of the plurality of self-interference signals that have been branched.

10 Claims, 11 Drawing Sheets

(51) Int. Cl.
    *H04L 27/26*     (2006.01)
    *H04L 5/14*     (2006.01)
    *H04B 1/12*     (2006.01)
    *H04B 1/525*     (2015.01)
    *H04L 5/00*     (2006.01)

(52) U.S. Cl.
    CPC ............ *H04L 27/26* (2013.01); *H04L 5/0023* (2013.01); *H04L 5/1461* (2013.01)

(58) Field of Classification Search
    USPC ........................................................ 370/278
    See application file for complete search history.

METHOD FOR PERFORMING SELF-INTERFERENCE REMOVAL BY COMMUNICATION DEVICE USING FDR MODE

CROSS-REFERENCE TO RELATED APPLICATIONS

This application is the National Stage filing under 35 U.S.C. 371 of International Application No. PCT/KR2016/000812, filed on Jan. 26, 2016, which claims the benefit of U.S. Provisional Application No. 62/148,748, filed on Apr. 17, 2015, the contents of which are all hereby incorporated by reference herein in their entirety.

TECHNICAL FIELD

The present invention relates to wireless communication, and more particularly, to a method for performing self-interference cancellation by a communication device using an FDR mode.

BACKGROUND ART

Full-duplex communication is a technology capable of theoretically doubling the capacity of a system compared to conventional half-duplex communication in which time resources or frequency resources are orthogonally divided by performing transmission and reception simultaneously by a node.

FIG. 1 is a conceptual view of a UE and a Base Station (BS) which support Full Duplex Radio (FDR).

In the FDR situation illustrated in FIG. 1, the following three types of interference are produced.

Intra-device self-interference: Because transmission and reception take place in the same time and frequency resources, a desired signal and a signal transmitted from a BS or UE are received at the same time at the BS or UE. The transmitted signal is received with almost no attenuation at a Reception (Rx) antenna of the BS or UE, and thus with much larger power than the desired signal. As a result, the transmitted signal serves as interference.

UE to UE inter-link interference: An Uplink (UL) signal transmitted by a UE is received at an adjacent UE and thus serves as interference.

BS to BS inter-link interference: The BS to BS inter-link interference refers to interference caused by signals that are transmitted between BSs or heterogeneous BSs (pico, femto, and relay) in a HetNet state and received by an Rx antenna of another BS.

Among such three types of interference, intra-device self-interference (hereinafter, self-interference (SI)) is generated only in an FDR system to significantly deteriorate performance of the FDR system. Therefore, first of all, intra-device SI needs to be cancelled in order to operate the FDR system.

DISCLOSURE

Technical Problem

An object of the present invention devised to solve the problem lies in a method for performing self-interference cancellation by a communication device using an FDR mode.

Another object of the present invention is to provide a communication device for performing self-interference cancellation in an FDR environment.

The technical objects to be achieved by the present invention are not limited to the aforementioned technical objects and other technical objects which are not mentioned can be clearly understood by those skilled in the art from the following description.

Technical Solution

The object of the present invention can be achieved by providing a method of performing self-interference cancellation by a communication device using a Full Duplex Radio (FDR) scheme, the method including branching a residual self-interference signal after cancellation of an antenna self-interference signal into a plurality of receive RF chains, and combining the plurality of branched self-interference signals based on a strength of each of the plurality of branched self-interference signals and a predefined threshold; and after the combining, determining whether to perform digital self-interference cancellation. The branching may include branching the residual self-interference signal into a plurality of self-interference signals having different power ratios.

When all the strengths of the plurality of branched self-interference signals are greater than or equal to the predefined threshold, the method may further include determining a combining coefficient value for the combining, combining the plurality of branched self-interference signals based on the determined combining coefficient value, and performing digital self-interference cancellation on the combined self-interference signal.

When one of the strengths of the plurality of branched self-interference signals is greater than or equal to the predefined threshold and another one of the strengths is less than or equal to the predefined threshold, the method may further include performing digital self-interference cancellation on a first branched self-interference signal having a strength less than or equal to the predefined threshold, and after performing self-interference cancellation on the first branched self-interference signal, performing digital self-interference cancellation on a second branched self-interference signal having a strength greater than or equal to the predefined threshold, based on a correlation of the self-interference signals.

When all the strengths of the plurality of branched self-interference signals are less than or equal to the predefined threshold, the method may further include performing digital self-interference cancellation on a first self-interference signal branching to a first receive RF chain and a second self-interference signal branching to a second receive RF chain, and combining the signal in the first receive RF chain after digital self-interference cancellation with the signal in the second receiving RF chain after digital self-interference cancellation.

In another aspect of the present invention, provided herein is a communication device for performing self-interference cancellation in a Full Duplex Radio (FDR) environment, the communication device including a plurality of receive RF chains, a branching unit configured to branch a residual self-interference signal after cancellation of an antenna self-interference signal into the plurality of receive RF chains, and a processor configured to combine the plurality of branched self-interference signals based on a strength of each of the plurality of branched self-interference signals and a predefined threshold and then determine whether to perform digital self-interference cancellation.

The branching unit may be configured to branch the residual self-interference signal into a plurality of self-interference signals having different power ratios.

When all the strengths of the plurality of branched self-interference signals are greater than or equal to the predefined threshold, the processor may be configured to determine a combining coefficient value for the combining, combine the plurality of branched self-interference signals based on the determined combining coefficient value and perform digital self-interference cancellation on the combined self-interference signal.

When one of the strengths of the plurality of branched self-interference signals is greater than or equal to the predefined threshold and another one of the strengths is less than or equal to the predefined threshold, the processor may be configured to perform digital self-interference cancellation on a first branched self-interference signal having a strength less than or equal to the predefined threshold and perform digital self-interference cancellation on a second branched self-interference signal having a strength greater than or equal to the predefined threshold, based on a correlation of the self-interference signals after performing self-interference cancellation on the first branched self-interference signal.

When all the strengths of the plurality of branched self-interference signals are less than or equal to the predefined threshold, the processor may be configured to perform digital self-interference cancellation on a first self-interference signal branching to a first receive RF chain and a second self-interference signal branching to a second receive RF chain and combine the signal in the first receive RF chain after digital self-interference cancellation with the signal in the second receiving RF chain after digital self-interference cancellation.

Advantageous Effects

According to an embodiment of the present invention, a residual self-interference signal after antenna self-interference cancellation is branched to measure the strengths of the branched self-interference signals and then perform digital self-interference cancellation based on the proposed combination criteria and method for digital self-interference cancellation. Thereby, the self-interference signal may be efficiently cancelled.

It will be appreciated by those skilled in the art that that the effects that can be achieved through the present invention are not limited to those described above and other effects of the present invention will be more clearly understood from the following description.

DESCRIPTION OF DRAWINGS

The accompanying drawings, which are included to provide a further understanding of the invention and are incorporated in and constitute a part of this application, illustrate embodiments of the disclosure and together with the description serve to explain the principle of the invention.

BEST MODE

Figure 1:
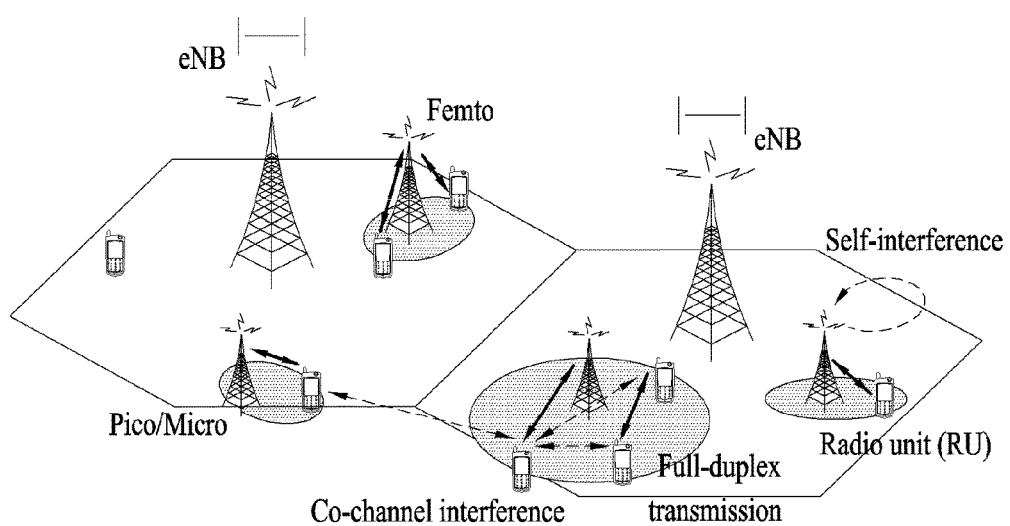
FIG. 1 is an exemplary view illustrating a network supporting a full-duplex/half-duplex communication operation mode of a user equipment (UE) proposed in the present invention.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

Figure 2:
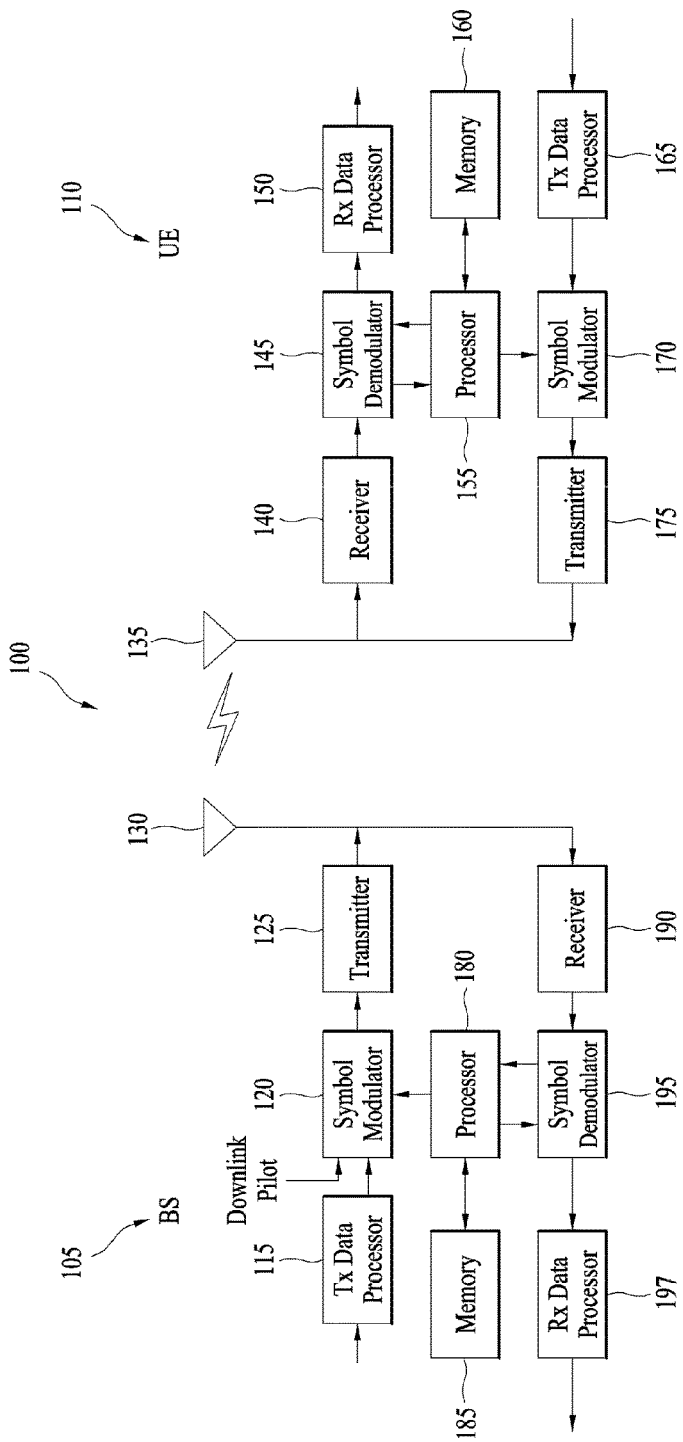
FIG. 2 is a block diagram for configurations of a base station 105 and a user equipment 110 in a wireless communication system 100.

FIG. 2 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 2, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

Figure 3:
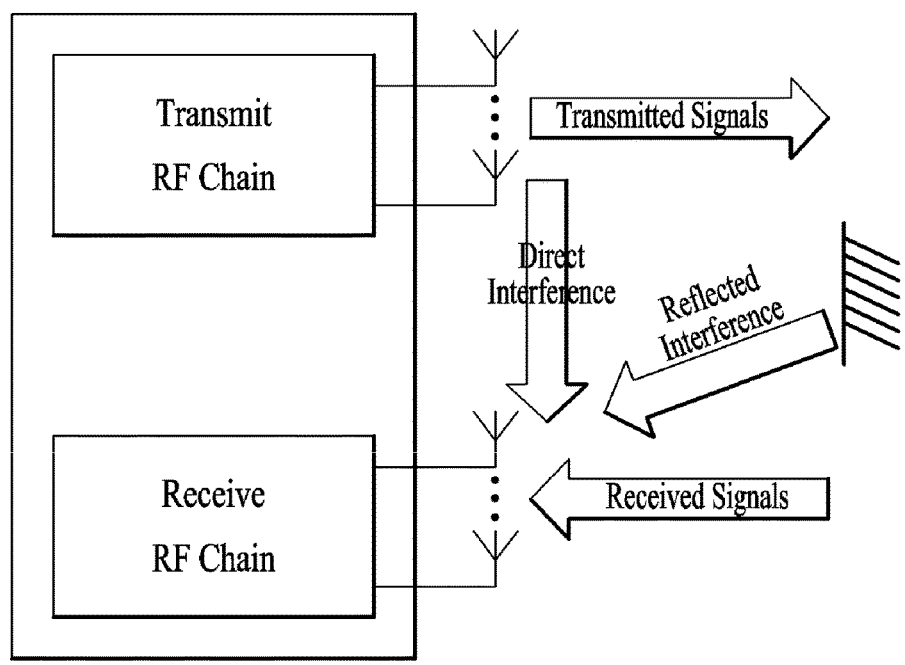
FIG. 3 is a conceptual diagram of self-interference (SI) and Tx/Rx links in an FDR communication environment.

FIG. 3 is a conceptual diagram of self-interference (SI) and Tx/Rx links in an FDR communication environment.

Referring to FIG. 3, the SI can be divided into direct interference, which is caused when a signal transmitted from a transmit (Tx) antenna is received at an Rx antenna of the same device without path attenuation, and reflected interference, which is caused when a signal transmitted from a Tx antenna is reflected on a surrounding object and then received at an Rx antenna of the same device. In addition, the strength of the SI is extremely higher than that of a desired signal due to a physical distance difference. Thus, the SI should be cancelled for efficient operation of the FDR system.

In order for the FDR system to operate effectively, the requirements of the self-IC according to the maximum transmission power can be determined as shown in the following Table 1. Self-IC requirements when the FDR is applied to a mobile communication system (BW=20 MHz).

Referring to Table 1, it may be noted that to effectively operate the FDR system in a 20-MHz BW, a UE needs 119-dBm Self-IC performance. A thermal noise value may be changed to $N_{0,BW}=-174$ dBm$+10 \times \log_{10}$(BW) according to the BW of a mobile communication system. In Table 3, the thermal noise value is calculated on the assumption of a 20-MHz BW. In relation to Table 3, for Receiver Noise Figure (NF), a worst case is considered referring to the 3GPP specification requirements. Receiver Thermal Noise Level is determined to be the sum of a thermal noise value and a receiver NF in a specific BW.

Types of Self-IC Schemes and Methods for Applying the Self-IC Schemes

Figure 4:
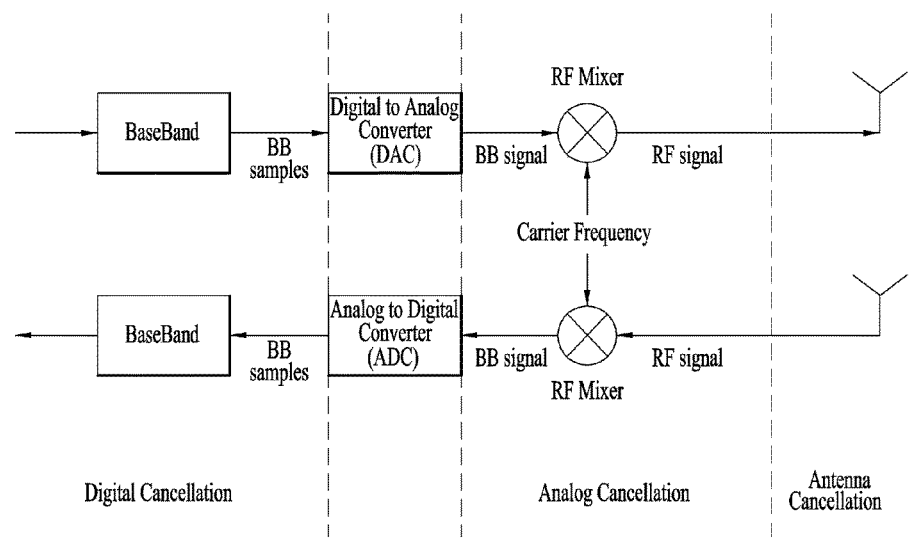
FIG. 4 is a view illustrating positions at which three interference schemes are applied, in a Radio Frequency (RF) Tx and Rx end of a device.

FIG. 4 is a view illustrating positions at which three Self-IC schemes are applied, in a Radio Frequency (RF) Tx and Rx end (or an RF front end) of a device. Now, a brief description will be given of the three Self-IC schemes.

Antenna Self-IC:

Antenna Self-IC is a Self-IC scheme that should be performed first of all Self-IC schemes. SI is cancelled at an antenna end. Most simply, transfer of an SI signal may be blocked physically by placing a signal-blocking object between a Tx antenna and an Rx antenna, the distance between antennas may be controlled artificially, using multiple antennas, or a part of an SI signal may be canceled through phase inversion of a specific Tx signal. Further, a part of an SI signal may be cancelled by means of multiple polarized antennas or directional antennas.

Analog Self-IC:

Interference is canceled at an analog end before an Rx signal passes through an Analog-to-Digital Convertor (ADC). An SI signal is canceled using a duplicated analog signal. This operation may be performed in an RF region or an Intermediate Frequency (IF) region. SI signal cancellation may be performed in the following specific method. A duplicate of an actually received SI signal is generated by delaying an analog Tx signal and controlling the amplitude and phase of the delayed Tx signal, and subtracted from a signal received at an Rx antenna. However, due to the analog signal-based processing, the resulting implementation complexity and circuit characteristics may cause additional distortion, thereby changing interference cancellation performance significantly.

Digital Self-IC:

Interference is canceled after an Rx signal passes through an ADC. Digital Self-IC covers all IC techniques performed in a baseband region. Most simply, a duplicate of an SI signal is generated using a digital Tx signal and subtracted from an Rx digital signal. Or techniques of performing precoding/postcoding in a baseband using multiple antennas so that a Tx signal of a UE or an eNB may not be received at an Rx antenna may be classified into digital Self-IC. However, since digital Self-IC is viable only when a digital modulated signal is quantized to a level enough to recover

TABLE 1

| Node Type | Max. Tx Power ($P_A$) | Thermal Noise. (BW = 20 MHz) | Receiver NF | Receiver Thermal Noise Level | Self-IC Target ($P_A$ − TN − NF) |
|---|---|---|---|---|---|
| Macro eNB | 46 dBm | −101 dBm | 5 dB (for eNB) | −96 dBm | 142 dB |
| Pico eNB | 30 dBm | | | | 126 dB |
| Femto eNB, WLAN AP | 23 dBm | | | | 119 dB |
| UE | 23 dBm | | 9 dB (for UE) | −92 dBm | 115 dB | information of a desired signal, there is a need for the prerequisite that the difference between the signal powers of a designed signal and an interference signal remaining after interference cancellation in one of the above-described techniques should fall into an ADC range, to perform digital Self-IC.

Figure 5:
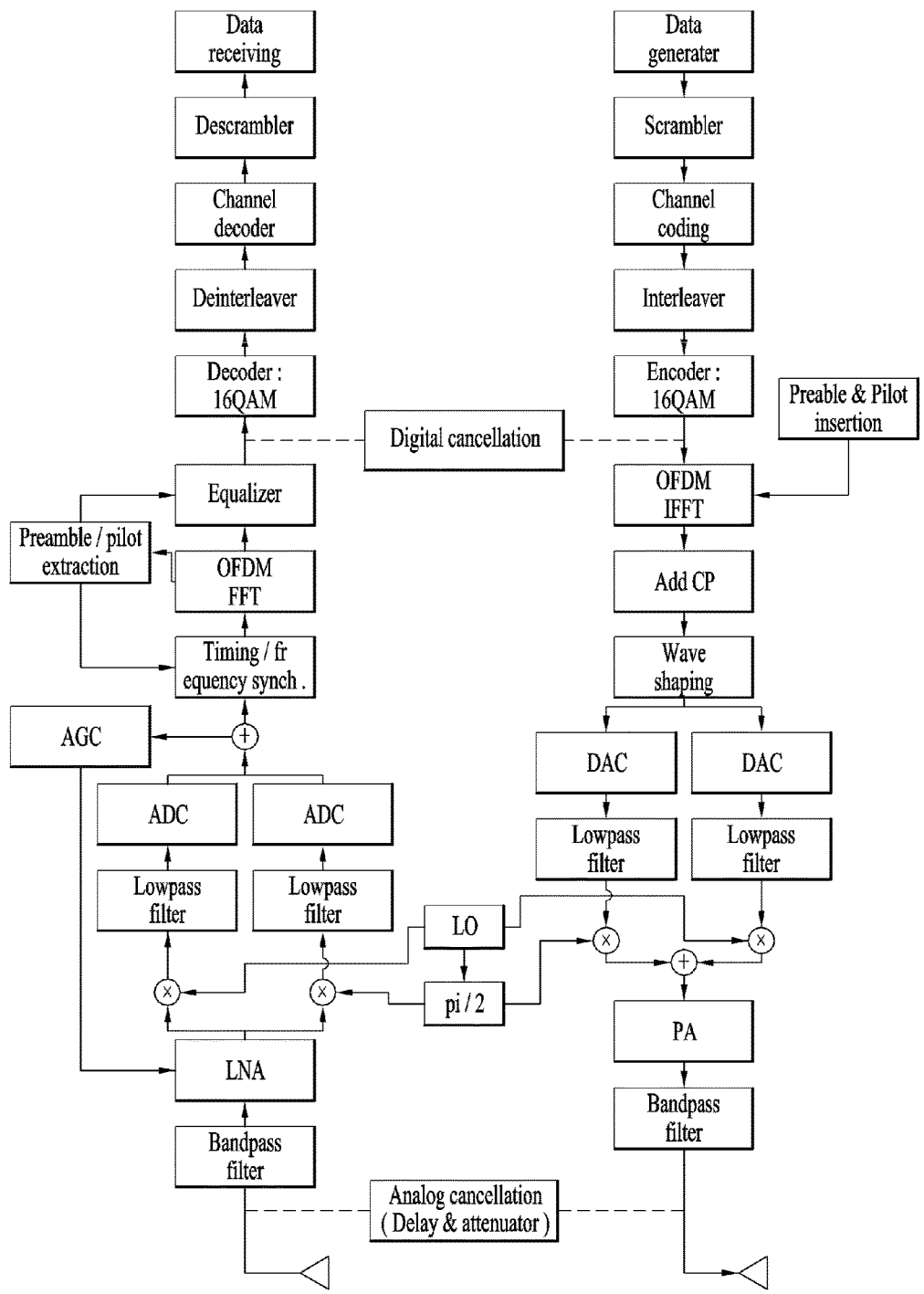
FIG. 5 is a block diagram for proposed Self-IC in an OFDM communication environment based on FIG. 4.

FIG. 5 is a block diagram of a Self-IC device in a proposed communication apparatus in an OFDM communication environment based on FIG. 4.

While FIG. 5 shows that digital Self-IC is performed using digital SI information before Digital to Analog Conversion (DAC) and after ADC, it may be performed using a digital SI signal after Inverse Fast Fourier Transform (IFFT) and before Fast Fourier Transform (FFT). Further, although FIG. 5 is a conceptual view of Self-IC though separation of a Tx antenna from an Rx antenna, if antenna Self-IC is performed using a single antenna, the antenna may be configured in a different manner from in FIG. 5. A functional block may be added to or removed from an RF Tx end and an RF Rx end shown in FIG. 5 according to a purpose.

Signal Modeling in the FDR System

Since the FDR system uses the same frequency between a transmitted signal and a received signal, nonlinear components at the RF end have a great influence. Particularly, the transmitted signal is distorted due to non-linearity of active devices such as a power amplifier (PA) and a low noise amplifier (LNA). Such distortion may be modeled into generation of high-order components of the transmitted signal. Among the components, even-order components can be effectively removed due to the conventional AC coupling or filtering technique as they affect the DC periphery. However, since the odd-order components occur adjacent to the existing frequency, they are difficult to remove, unlike the even-order components, and have a significant effect. Considering nonlinearity of the odd-order components, the received signal after ADC in the FDR system may be expressed using the Parallel Hammerstain (PH) model as given by Equation 1 below.

$$y(n) = h_D(n) * x_D(n) + \sum_{\substack{k=1,\ldots,K \\ k=odd}} h_{SI,k}(n) * |x_{SI}(n)|^{k-1} x_{SI}(n) + z(n), \quad \text{Equation 1}$$

where $x_D(n)$ is data to be received, $h_D(n)$ is a desired channel that the data to be received undergoes, $x_{SI}(n)$ is the data transmitted by the device, $h_{SI,k}(n)$ is a self-channel that the data transmitted by the transmitter undergoes, k denotes a linear component when set to 1 and denotes a nonlinear component when set to an odd number greater than or equal to 3, and $z(n)$ is additive white Gaussian noise (AWGN).

Hereinafter, a combining technique in conventional wireless communication will be briefly described.

Generally, in digital wireless communication, there are techniques for enhancing signal reception performance by combining a plurality of signals having undergone different channels. A brief description of each technique will be given below.

Equal Gain Combining (EGC): This technique simply combines received signals without any gain.

Maximum Ratio Combining (MRC): This is a technique for obtaining a diversity gain by maximizing a signal-to-noise ratio (SNR) of a received signal by constructing a coefficient with the value of a channel that the received signal undergoes. Using the MRC technique, the final SNR of the received signals can be expressed as the sum of the SNRs of respective signals $$\left(\eta_{MRC} = \sum_{k=1}^{N} \eta_k\right).$$

However, in the presence of interference, the MRC fails to achieve optimum performance and performance is greatly degraded.

Selection Combining (SC): This is a technique for selecting a received signal with the largest power among a plurality of received signals. The obtainable diversity gain is $$\sum_{k=1}^{N} \frac{1}{k}.$$

Interference Rejection Combining (IRC): This is a technique that performs combination in consideration of influence of interference using the correlation of interference in received signals. This technique obtains optimum performance in the presence of interference.

In order to reduce the operation time of the self-IC method in the analog system, basically, a part of the received signal is branched and interference cancellation techniques having different performances are executed, such that self-IC performance is stabilized more quickly than with the conventional method of exhaustively searching all cases. However, the limitation of this technique is that power loss may occur and performance may be degraded although the operation time of the self-IC technique may be reduced by branching the received signal. Although there are suggestions of combining branched digital signals to complement such power loss, it is necessary to develop a criterion for combining signals. In addition, a specific technique related to how to apply the digital self-IC technique to the signals branched after passing through the ADC after analog self-IC is required.

Therefore, in the present invention, an appropriate criterion for combining the branched signals to improve performance of self-IC considering characteristics of a self-interference signal remaining after passing through the ADC is presented. In addition, various combining techniques to improve performance of FDR system are presented.

Figure 6:
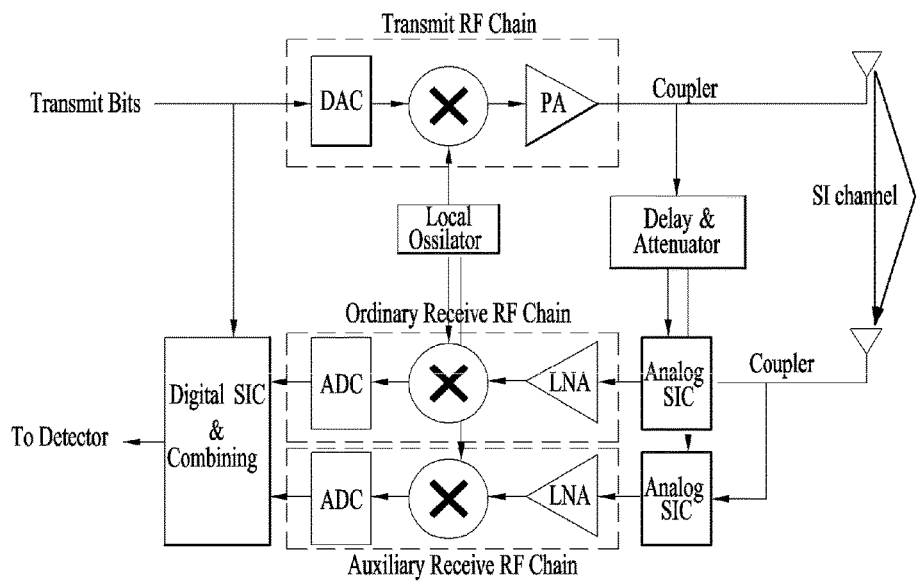
FIG. 6 is a diagram illustrating a basic structure of Tx & Rx RF chains assumed in the present invention.

FIG. 6 is a diagram illustrating a basic structure of Tx & Rx RF chains assumed in the present invention.

As described above, in FIG. 6, a received signal may be branched into an ordinary signal and an auxiliary signal using a device such as a coupler before analog self-IC, which may be expressed as Equation 2 below.

$$y(t) = \sqrt{\alpha_1} y(t) + \sqrt{\alpha_2} y(t) = y^{ord}(t) + y^{aux}(t), \quad \text{Equation 2}$$

where $\alpha_1$ and $\alpha_2$ represent a power ratio of a signal entering the ordinary receive RF chain and a signal entering the auxiliary receive RF chain in branching the received signal ($\alpha_1 + \alpha_2 = 1$), and $y^{ord}(t)$ and $y^{aux}(t)$ represent the signal entering the ordinary receive RF chain and the signal entering the auxiliary receive RF chain. In addition, there may be one or more auxiliary signals that branch off from the received signal. That is, the received signal may be branched into a plurality of auxiliary signals.

When the branched signals $y^{ord}(t)$ and $y^{aux}(t)$ undergo analog self-IC in the analog SIC unit and are passed through the ADC, they may be expressed as simple signals given by Equation 3 below.

$$y^{ord}(n) = \sqrt{\alpha_1}\, h_D(n)*x_D(n) + \underbrace{\sum_{\substack{k=1,\ldots,K \\ k=odd}} \sqrt{\alpha_1}\, \tilde{h}_{SI,k}^{ord}(n)*|x_{SI}(n)|^{k-1}x_{SI}(n)}_{\text{Residual SI at ordinary signal}(SI_{residual}^{ord}(n))} + z^{ord}(n), \quad \text{Equation 3}$$

$$y^{aux}(n) = \sqrt{\alpha_2}\, h_D(n)*x_D(n) + \underbrace{\sum_{\substack{k=1,\ldots,K \\ k=odd}} \sqrt{\alpha_2}\, \tilde{h}_{SI,k}^{aux}(n)*|x_{SI}(n)|^{k-1}x_{SI}(n)}_{\text{Residual SI at ordinary signal}(SI_{residual}^{aux}(n))} + z^{aux}(n),$$

where $$\tilde{h}_{SI,k}^{ord}(n) = \tilde{h}_{SI,k}(n) - \hat{h}_{SI,k}^{ord}(n),$$
$$\tilde{h}_{SI,k}^{aux}(n) = \tilde{h}_{SI,k}(n) - \hat{h}_{SI,k}^{aux}(n),$$

and $\hat{h}_{SI,k}^{ord}(n)$ and $\hat{h}_{SI,k}^{aux}(n)$ are self-interference channels estimated for signal generation for analog interference cancellation in the Delay & Attenuator block. $SI_{residual}^{ord}(n)$ and $SI_{residual}^{aux}(n)$ are residual self-interference signals of the ordinary signal and the auxiliary signal, respectively. In this disclosure, it is assumed that the LNA and Mixer (denoted by the symbol ⓧ in FIG. 6) of the receive RF chain and ADC devices have ideal characteristics.

A Solution for Determining the Combining Location and Method in the Digital Domain As shown in Equation 3, the branched signals may have different residual self-interference signal characteristics of the received signal after undergoing analog self-IC. For example, if the branched signals undergo analog self-IC with the same value or different values, or only a signal with a lower power at a certain ratio rather than the same signal strength is brought through the coupler in branching the analog signal, the signals may vary depending on the value of automatic gain control (AGC) determined by the intensity of power of the received signal as the data may be distorted due to a clipping effect by which some digital values go beyond a signal representation range after the signals pass through the ADC.

If the MRC (Maximum Ratio Combining) scheme is employed by $\alpha_1$ and $\alpha_2$, the values of a power ratio of the branched signals, optimal performance may be ensured after the self-interference signal is completely cancellation. However, in the typical FDR system, self-interference is always present, and therefore determining a combining coefficient simply based on the receive power may result in amplification of the residual self-interference signal. This may be expressed by Equation 4.

$$y^{comb}(n) = \sqrt{\alpha_1}\, y^{ord}(n) + \sqrt{\alpha_2}\, y^{aux}(n) \quad \text{Equation 4}$$
$$= h_D(n)*x_D(n) + \underbrace{\alpha_1 \times SI_{residual}^{ord}(n) + \alpha_2 \times SI_{residual}^{aux}(n)}_{\text{combined residual SI}} + z^{comb}(n),$$

Equation 4 represents combining performed in consideration of the desired signal of Equation 3, and suggests that the combined residual self-interference (SI) signal is combined with the same gain.

If the power of a desired signal of the ordinary signal is greater than that of the auxiliary signal and the intensity of a residual self-interference signal is greater than that of an auxiliary signal ($\alpha_1 > \alpha_2$), and the strength of the residual SI signal of the ordinary signal is also greater that of the auxiliary signal ($SI_{residual}^{ord}(n) > SI_{residual}^{aux}(n)$), it may be seen from Equation 4 that the self-interference greatly increases after the combining operation. Typically, if $\alpha_1 > \alpha_2$, $SI_{residual}^{ord}(n) > SI_{residual}^{aux}(n)$. Therefore, when combining is performed without consideration of interference, the residual self-interference signal is intensified as shown in Equation 4.

In addition, in performing an SC (Selection Combining) scheme, a signal having a high power of the received signal is simply selected. However, as described above, the fact that the receive power is large means that there is a high possibility of presence of interference. Therefore, performing selection without considering the residual self-interference signal greatly degrades FDR performance.

In order to address issues such as amplification of a self-interference signal or selection of a signal causing strong interference, it is necessary to determine where to perform the combination according to the strength of the residual self-interference signals in the ordinary signal and the auxiliary signal (i.e., whether to perform combining before or after the digital self-IC unit), and what gain value should be used to perform the combining, and which combining scheme is to be used.

Figure 7:
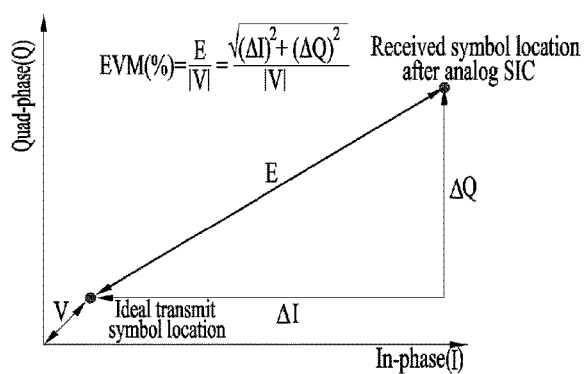
FIG. 7 illustrates an error vector magnitude (EVM) scheme, which is one of the methods for measuring the strength (or amount) of the residual self-interference signal of a received signal.

FIG. 7 illustrates an error vector magnitude (EVM) scheme, which is one of the methods for measuring the strength (or amount) of the residual self-interference signal of a received signal.

The EVM, which is used for one of the methods for measuring the strength (or amount) of the residual self-interference signal of a received signal, is a value obtained by dividing the vector difference between the transmitted signal and the received signal by the vector magnitude of the transmitted signal. FIG. 7 shows an example of an EVM considering the power of the self-interference signal.

In the FDR system, since the transmitted signal is known, the EVM of the signal received in the digital domain may be calculated. Since the power intensity of the received signal is several tens of dB greater than that of the transmitted signal, the amounts of the residual self-interference signals may be compared. Another method to measure the amount of the residual self-interference signal of each received signal is to use channel estimation. An effective channel ($\tilde{h}_{SI,k}^{ord}(n) = \hat{h}_{SI,k}(n) - \hat{h}_{SI,k}^{ord}(n)$, $\tilde{h}_{SI,k}^{aux}(n) = \hat{h}_{SI,k}(n) - \hat{h}_{SI,k}^{aux}(n)$) after analog self-IC can be estimated based on a reference signal, which is a transmitted signal, and thus an absolute amount of the residual self-interference signal may be measured.

The present invention includes determining a position, a method, and a combining coefficient for combining branched signals based on a measured value of residual self-interference signals included in the branched signals. For simplicity, it is assumed in the description that the power is branched into two signals having different powers ($\alpha_1 > \alpha_2$), but the other cases are not excluded. There may be three cases distinguished from each other according to the measured values of the residual self-interference signals of the two signals (the branched ordinary signal and auxiliary signal) as described below.

Case 1: The absolute value of the amount (or intensity) of the residual self-interference signals of two signals is greater than or equal to a predefined threshold.

Case 2: The absolute value of the residual self-interference signal of one of the two signals is greater than or equal to the threshold value, but the amount (or intensity) of the other residual self-interference signal is less than or equal to a predefined threshold.

Case 3: The absolute value of the amount (or intensity) of the residual self-interference signals of the two signals is less than or equal to a predefined threshold.

Here, the predefined threshold may be determined to be a different value depending on the antenna/analog/digital self-IC performance, and may also vary depending on the characteristics of the residual self-interference signal component. For example, if digital self-IC fails due to high residual self-interference signal strength after antenna/analog/digital self-IC in both the ordinary receive RF chain and the auxiliary receive RF chain, the self-interference signal strength may become the threshold. In addition, the residual self-interference signal strength values in the ordinary receive RF chain and the auxiliary receive RF chain may be compared with each other and the lower or higher residual self-interference signal strength may become the threshold. Further, since performance of each of the antenna/analog/digital self-IC may vary over time, the threshold may also change accordingly.

Proposal 1: Determine the Timing and Method of Combining Considering the Magnitude (Intensity or Amount) and Characteristics of the Residual Self-Interference Signal Included in the Received Signal In Case 1, since a problem may occur due to a large self-interference signal when digital self-IC is performed, a combining coefficient is determined considering residual self-interference signals in a plurality of received signals before digital self-IC is performed. Then, combining is performed so as to attenuate the residual self-interference signal in the final signal.

In Case 2, since it is determined that the self-interference signal in one signal is weak, it is advantageous to perform the digital self-IC process on a received signal having a residual self-interference signal which is weak among the received signals. Therefore, information necessary for digital self-IC is received and the digital self-IC is performed such that residual self-interference of a received signal having a smaller strength of the residual self-interference signal is first performed by assigning priorities, and then residual self-interference in the remaining received signals is attenuated based on the correlation information on the residual self-interference.

Finally, in Case 3, since the strengths of the residual self-interference signals of the two signals are less than the predefined threshold, the two signals are combined after undergoing digital self-IC.

In addition, the proposed schemes described above may be implemented independently or in combination with some of the proposed schemes. This procedure may be represented as shown in FIG. 8.

Figure 8:
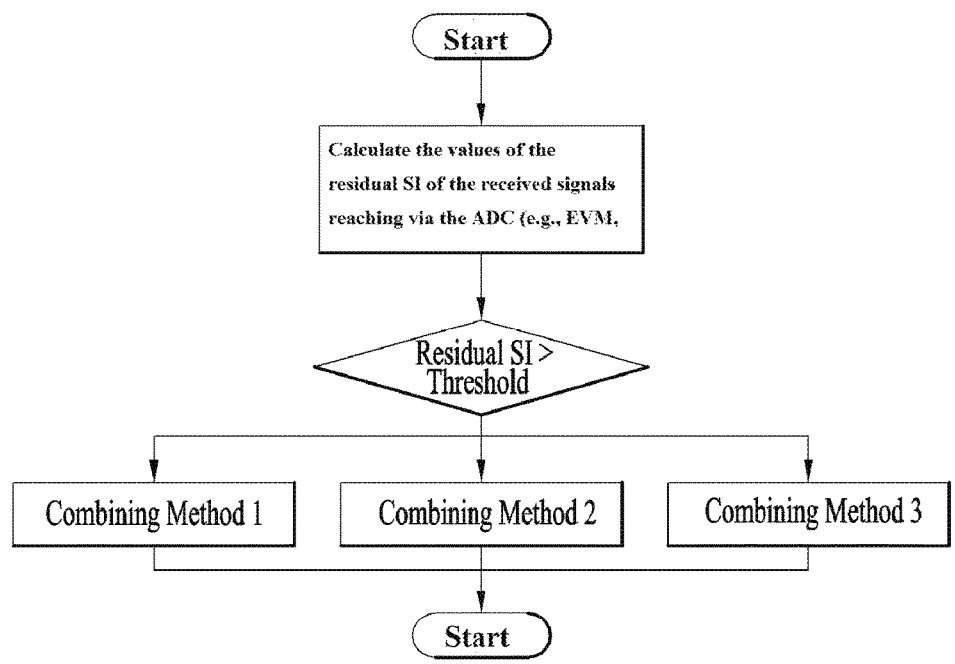
FIG. 8 is a flowchart illustrating a combining position, method, and the like proposed in the present invention.

FIG. 8 is a flowchart illustrating a combining position, method, and the like proposed in the present invention.

Referring to FIG. 8, first, the strength (or amount) of the residual self-interference signals of the received signals reaching via the ADC may be calculated in the receive Rx chain. For example, EVM may be used to calculate the strength (or amount) of the residual self-interference signals. Thereafter, it may be determined whether the strength (or amount) of the calculated residual self-interference signals exceeds a predefined threshold. The combining operation may be performed using one of the combining methods 1, 2 and 3 presented in Cases 1, 2 and 3, depending on whether the calculated strength (or amount) of the residual self-interference signals exceeds the predefined threshold.

Figure 9:
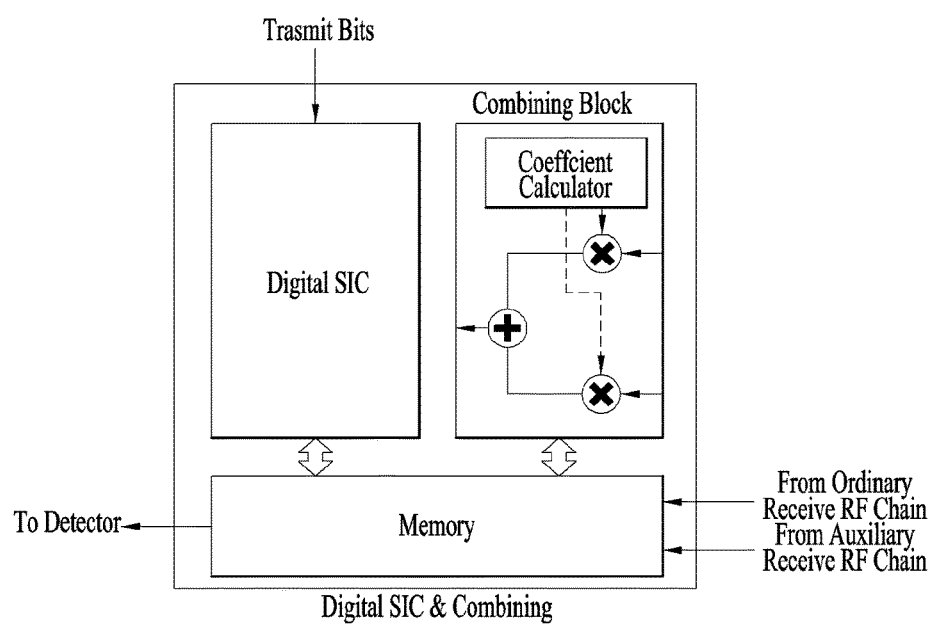
FIG. 9 is a diagram illustrating an example of the structure of a digital self-interference cancellation and combining block in an RF chain.

The basic structure of the digital self-IC and combining block for applying the above-described techniques is shown in FIG. 9.

FIG. 9 is a diagram illustrating an example of the structure of a digital self-IC and combining block in an RF chain.

As shown in FIG. 9, the digital self-IC and combining block may consist of three sub-blocks. The digital self-IC and combining block may include a memory 910 capable of receiving and storing received data and may transmitting or receiving data information to or from other sub-blocks. The digital self-IC and combining block may further include a combining block 920 capable of combining the data received from the memory 910 with various coefficients and storing the combined data in the memory 910 and a digital self-IC block 930 for performing digital self-IC on the data received from the memory 910 based on the transmit bits and the estimated channel. In this case, since the memory 910 functions as a buffer, the operation order of the digital self-IC block 930 and the combining block 920 may be changed according to the situation, and the digital self-IC may be performed on multiple digital signals at different times using one block. Hereinafter, the description will be logically given of the proposed techniques based on the structure of FIG. 9.

Proposal 2: Performing the Combining Operation Based on Instantaneous Residual Self-Interference Estimation Information Before Digital Self-IC If the magnitude of residual self-interference after analog self-IC is very large, it is unlikely that a given target SINR will be matched even after the signals undergo digital self-IC. Therefore, pre-processing may be performed before digital self-IC to reflect the residual self-interference value in the combining operation. Accordingly, digital self-IC needs to be performed thereafter. In this case, the combining coefficient may be determined considering the residual self-interference of each signal and power branching ratio ($\alpha_1$, $\alpha_2$).

Figure 10:
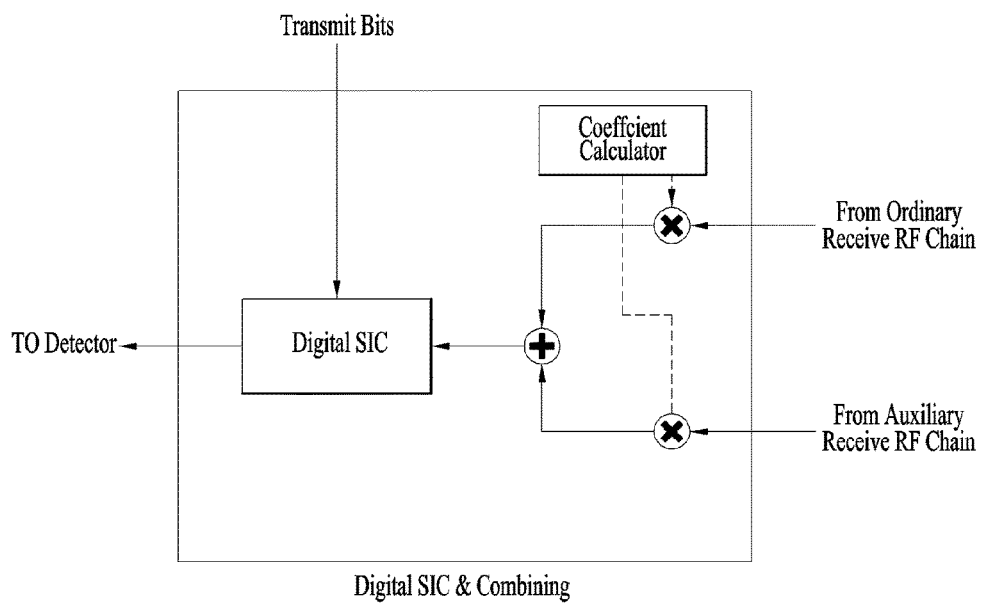
FIG. 10 is a logical diagram illustrating the digital self-interference cancellation and combining block in FIG. 9 based on a technique proposed in an embodiment.

FIG. 10 is a logical diagram illustrating the digital self-IC and combining block in FIG. 9 based on a technique proposed in an embodiment.

Referring to FIG. 10, the digital self-IC and combining block may include a coefficient calculator. The coefficient calculator calculates combining coefficients for the ordinary Rx RF chain signal and the auxiliary Rx RF chain signal, respectively. The coefficient calculator combines the ordinary Rx RF chain signal and the auxiliary Rx RF chain signal by applying the calculated combining coefficients thereto. The combined signal is input to a digital self-IC (SIC) block. The digital SIC block detects the signals based on the combined signal and the transmit bits.

As an example, the combining coefficients may be estimated based on the weighted MRC before the digital self-IC. As described above, MRC based on the existing channel coefficients has a problem of boosting residual self-interference. To solve this problem, the digital self-IC and combining block may estimate weighted MRC coefficients considering the residual self-interference included in the received signal. The MRC coefficients estimated using the channel information on self-interference may be calculated as $$w^{ord}(n) = \frac{\sqrt{\alpha_1}}{h_{SI}^{ord}(n)}, w^{aux}(n) = \frac{\sqrt{\alpha_2}}{h_{SI}^{aux}(n)}.$$

In addition, coefficients of weighted MRC in another form may be calculated considering the residual self-interference.

Proposal 3: Performing the Combining Operation Based on Statistical or Instantaneous Residual Self-Interference Information after Digital Self-IC Separately from the method of performing the combining operation based on the instantaneous residual self-interference estimation information before the digital self-IC disclosed in Proposal 2, the signals can be combined after processing of digital self-IC because it is possible to perform digital self-IC with each signal alone if the magnitude of residual self-interference is less than a threshold after analog self-IC. Therefore, it is possible to perform digital self-IC and perform the combining operation based on the result of digital self-IC.

Figure 11:
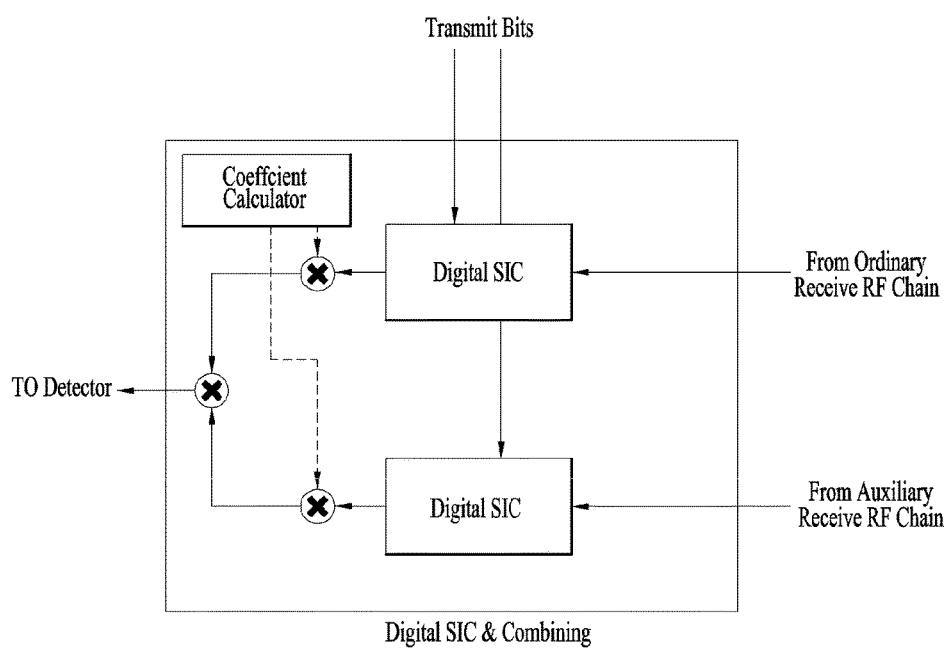
FIG. 11 is a logical diagram illustrating the digital self-interference cancellation and combining block in FIG. 9 based on a technique proposed in an embodiment.

FIG. 11 is a logical diagram illustrating the digital self-interference cancellation and combining block in FIG. 9 based on a technique proposed in an embodiment.

Referring to FIG. 11, digital self-IC is performed on the ordinary Rx RF chain signal and the auxiliary Rx RF chain signal are generated by each digital SIC block, and then the combining coefficients calculated by the coefficient calculator after digital self-IC are applied to combine the two signals.

As Embodiment 1 of Proposal 3, the combining coefficients may be estimated based on weighted MRC after digital self-IC. As described above, the power of the residual self-interference signal may be measured after the digital self-IC, using a reference such as the EVM, and the weighted MRC coefficients may be estimated in consideration of the measured residual self-interference signals. As the weighted MRC coefficients based on the channel information, the coefficients in the embodiment of Proposal 2, $$w^{ord}(n) = \frac{\sqrt{\alpha_1}}{h_{SI}^{ord}(n)}, w^{aux}(n) = \frac{\sqrt{\alpha_2}}{h_{SI}^{aux}(n)}.$$

After the residual self-interference after the digital self-IC is measured, the coefficients of weighted MRC may be calculated as $$w_{D\text{-}SIC}^{ord}(n) = \frac{\sqrt{\alpha_1}}{h_{SI\_DSIC}^{ord}(n)}, w_{D\text{-}SIC}^{aux}(n) = \frac{\sqrt{\alpha_2}}{h_{SI\_DSIC}^{aux}(n)}.$$

Here, $h_{SI\_DSIC}^{ord}(n)$ and $h_{SI\_DSIC}^{aux}(n)$ are the values of effective channels that the residual self-interference signals are subjected to after digital self-IC. In addition, the coefficients of weighted MRC in another form may be calculated considering the residual self-interference.

As a second embodiment of Proposal 3, after digital self-IC, the combining coefficients may be estimated based on an Interference Rejection Combining (IRC) technique. If it is difficult to measure the residual self-interference value using the EVM after digital self-IC (for example, if EVM measurement for each tone in multi-tone communication such as OFDM is impossible), or if the statistical values of self-interference signals can be obtained (for example, if statistical characteristics provided based on accumulated results over several hours and the current environment is the same as the previous environment (the same Tx power and the same branched power ratio), a statistical value of the residual self-interference (e.g., a mean value, a variance value) may be used to estimate the combining coefficients. When the variances of the residual self-interference in the respective signals are $(\sigma_{SI\_DSIC}^{ord})^2$ and $(\sigma_{SI\_DSIC}^{aux})^2$, the coefficients may be calculated as $$w_{D\text{-}SIC}^{ord}(n) = \frac{\sqrt{\alpha_1}}{\sigma_n^2 + (\sigma_{SI\_DSIC}^{ord})^2}, w_{D\text{-}SIC}^{aux}(n) = \frac{\sqrt{\alpha_2}}{\sigma_n^2 + (\sigma_{SI\_DSIC}^{aux})^2}.$$

Other weight values may also be calculated considering the statistical characteristics of residual self-interference.

Proposal 4: Performing the Combining Operation Based on Statistical or Instantaneous Residual Self-Interference Information after Digital Self-IC Separately from Proposals 2 and 3, if the magnitude of the residual self-interference of only one signal after analog self-IC is less than a threshold, digital self-IC may be performed on the signal first, and then the processing result may be reflected in the other signal in cascade.

Figure 12:
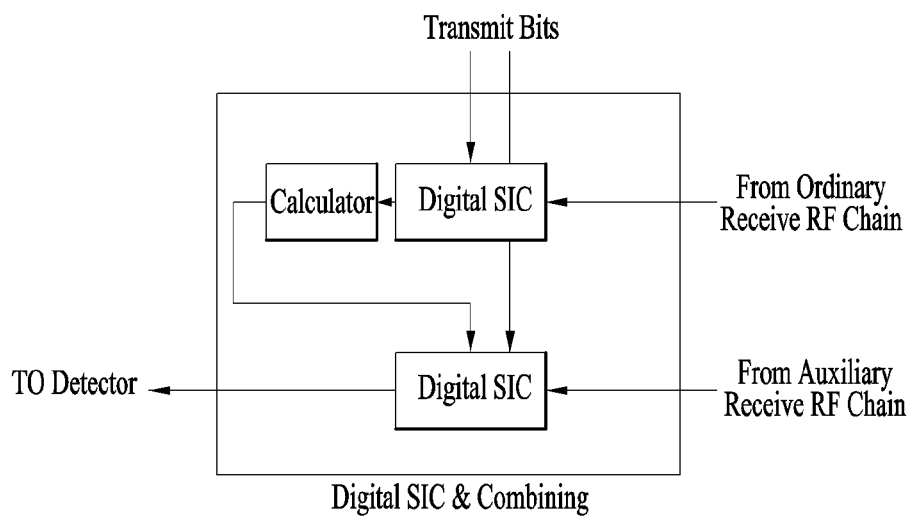
FIG. 12 is a logical diagram illustrating the digital self-interference cancellation and combining block in FIG. 9 based on a proposed technique.
Figure 12:
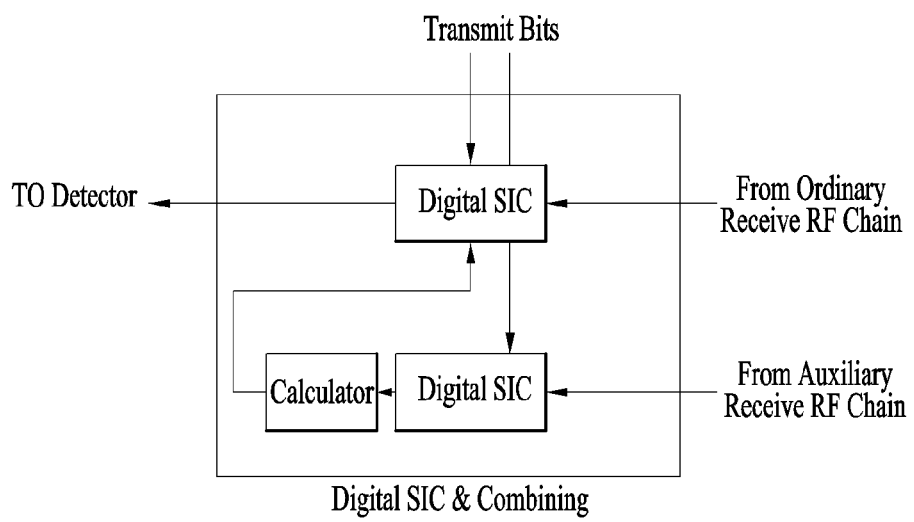

FIG. 12 is a logical diagram illustrating the digital self-IC and combining block in FIG. 9 based on a proposed technique.

In FIG. 12, the left diagram illustrates a case where the magnitude of the residual self-interference of the ordinary signal is less than or equal to a threshold and the magnitude of the residual self-interference of the auxiliary signal is greater than or equal to the threshold, and the right diagram of FIG. 12 illustrates a case where the magnitude of the residual self-interference of the auxiliary signal is less than or equal to the threshold and the magnitude of the residual self-interference of the ordinary signal is greater than or equal to the threshold.

Here, of the two signals, one signal to be processed first is determined (for example, the signal not exceeding the threshold), and digital self-IC is performed thereon. If self-IC is performed well, the residual self-interference component may be predicted. During digital self-IC previously performed based on the correlation of the residual self-interferences of the two signals, information based on the correlation is handed over such that the digital self-IC can be performed on the other signal.

Proposal 5: Performing Digital Self-IC Using a Zero-Forcing Based Vector

Signals after analog self-IC and measurement of the ADC are briefly described based on Equation 3 as Equation 5 below.

$$y^{ord}(n) = \qquad \text{Equation 5}$$
$$\sqrt{\alpha_1} h_D(n) * x_D(n) + \sqrt{\alpha_1} h_{SI}^{ord}(n) * x_{SI}^{ord}(n) + z^{ord}(n),$$
$$y^{aux}(n) = \sqrt{\alpha_2} h_D(n) * x_D(n) + \sqrt{\alpha_2} h_{SI}^{aux}(n) * x_{SI}^{aux}(n) + z^{aux}(n).$$

where designing a zero-forcing filter at the Rx end using the estimated self-interference channel information may yield $G = \hat{H}^\dagger = (\hat{H}^H \hat{H})^{-1} \hat{H}^H$. Here, $\hat{H} = [\hat{h}_{SI}^{ord}(n), \hat{h}_{SI}^{aux}(n)]^T$, and † denotes pseudo-inverse. If the estimated $\hat{H} = [\hat{h}_{SI}^{ord}(n), \hat{h}_{SI}^{aux}(n)]^T$ is perfect, no residual self-interference would be left. However, residual self-interference remains due to the error of the estimated channel. In this case, digital self-IC may be selectively performed, and various combining operations disclosed in Proposals 2 and 3 may be performed.

The embodiments described above are constructed by combining elements and features of the present invention in a predetermined form. Each element or feature should be understood as optional unless explicitly mentioned otherwise. Each of the elements or features can be implemented without being combined with other elements. In addition, some elements and/or features may be combined to configure an embodiment of the present invention. The sequence of operations discussed in the embodiments of the present invention may be changed. Some elements or features of one embodiment may also be included in another embodiment, or may be replaced by corresponding elements or features of another embodiment. Claims that are not explicitly cited in each other in the appended claims may be combined to establish an embodiment of the present invention or be included in a new claim by subsequent amendment after the application is filed.

The embodiments of the present invention may be achieved by various means, for example, hardware, firmware, software, or a combination thereof. In a hardware configuration, an embodiment of the present invention may be achieved by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

The present invention may be embodied in specific forms other than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein.

INDUSTRIAL APPLICABILITY

A method for performing self-interference cancellation by a communication device using the FDR mode may be industrially used in various wireless communication systems such as the 3GPP LTE/LTE-A system and the 5G communication system.

What is claimed is:

1. A method for performing self-interference cancellation by a communication device using a Full Duplex Radio (FDR) scheme, the method comprising:
   branching a residual self-interference signal after cancellation of an antenna self-interference signal into a plurality of receive Radio Frequency (RF) chains;
   determining whether a strength of each of the plurality of branched self-interference signals is greater than a predefined threshold;
   performing digital self-interference cancellation after combining the plurality of branched self-interference signals, responsive to determining that all of the plurality of branched self-interference signals are greater than the predefined threshold; and
   performing digital self-interference cancellation before combining the plurality of branched self-interference signals, responsive to determining that at least one of the plurality of branched self-interference signals is less than or equal to the predefined threshold.

2. The method according to claim 1, wherein the branching comprises:
   branching the residual self-interference signal into a plurality of self-interference signals having different power ratios.

3. The method according to claim 1, wherein, responsive to determining that all the strengths of the plurality of branched self-interference signals are greater than the predefined threshold, the performing digital self-interference cancellation after combining the plurality of branched self-interference signals comprises:
   determining a combining coefficient value for the combining;
   combining the plurality of branched self-interference signals based on the determined combining coefficient value; and
   performing digital self-interference cancellation on the combined self-interference signal.

4. The method according to claim 1, wherein, responsive to determining that one of the strengths of the plurality of branched self-interference signals is greater than the predefined threshold and another one of the strengths is less than or equal to the predefined threshold, the performing digital self-interference cancellation before combining the plurality of branched self-interference signals comprises:
   performing digital self-interference cancellation on a first branched self-interference signal having a strength less than or equal to the predefined threshold; and
   after performing self-interference cancellation on the first branched self-interference signal, performing digital self-interference cancellation on a second branched self-interference signal having a strength greater than the predefined threshold based on a correlation of the self-interference signals.

5. The method according to claim 1, wherein, responsive to determining that all the strengths of the plurality of branched self-interference signals are less than or equal to the predefined threshold, the performing digital self-interference cancellation before combining the plurality of branched self-interference signals comprises:
   performing digital self-interference cancellation on a first self-interference signal branching to a first receive RF chain and a second self-interference signal branching to a second receive RF chain; and
   combining the signal in the first receive RF chain after digital self-interference cancellation with the signal in the second receiving RF chain after digital self-interference cancellation.

6. A communication device for performing self-interference cancellation in a Full Duplex Radio (FDR) environment, the communication device comprising:
   a plurality of receive Radio Frequency (RF) chains;
   a coupler configured to branch a residual self-interference signal after cancellation of an antenna self-interference signal into the plurality of receive RF chains; and
   a processor configured to:
   determine whether a strength of each of the plurality of branched self-interference signals is greater than a predefined threshold and then threshold;
   perform digital self-interference cancellation after combining the plurality of branched self-interference signals, responsive to determining that all of the plurality of branched self-interference signals are greater than the predefined threshold; and
   perform digital self-interference cancellation before combining the plurality of branched self-interference signals, responsive to determining that at least one of the plurality of branched self-interference signals is less than or equal to the predefined threshold.

7. The communication device according to claim 6, wherein the coupler is configured to branch the residual self-interference signal into a plurality of self-interference signals having different power ratios.

8. The communication device according to claim 6, wherein, responsive to determining that all the strengths of the plurality of branched self-interference signals are greater than the predefined threshold, the processor is configured to:

determine a combining coefficient value for the combining;

combine the plurality of branched self-interference signals based on the determined combining coefficient value; and perform digital self-interference cancellation on the combined self-interference signal.

9. The communication device according to claim 6, wherein, responsive to determining that one of the strengths of the plurality of branched self-interference signals is greater than the predefined threshold and another one of the strengths is less than or equal to the predefined threshold, the processor is configured to:

perform digital self-interference cancellation on a first branched self-interference signal having a strength less than or equal to the predefined threshold;

perform self-interference cancellation on the first branched self-interference signal; and perform digital self-interference cancellation on a second branched self-interference signal having a strength greater than the predefined threshold, based on a correlation of the self-interference signals.

10. The communication device according to claim 6, wherein, responsive to determining that all the strengths of the plurality of branched self-interference signals are less than or equal to the predefined threshold, the processor is configured to:

perform digital self-interference cancellation on a first self-interference signal branching to a first receive RF chain and a second self-interference signal branching to a second receive RF chain; and combine the signal in the first receive RF chain after digital self-interference cancellation with the signal in the second receiving RF chain after digital self-interference cancellation.

* * * * *